UNITED STATES PATENT OFFICE.

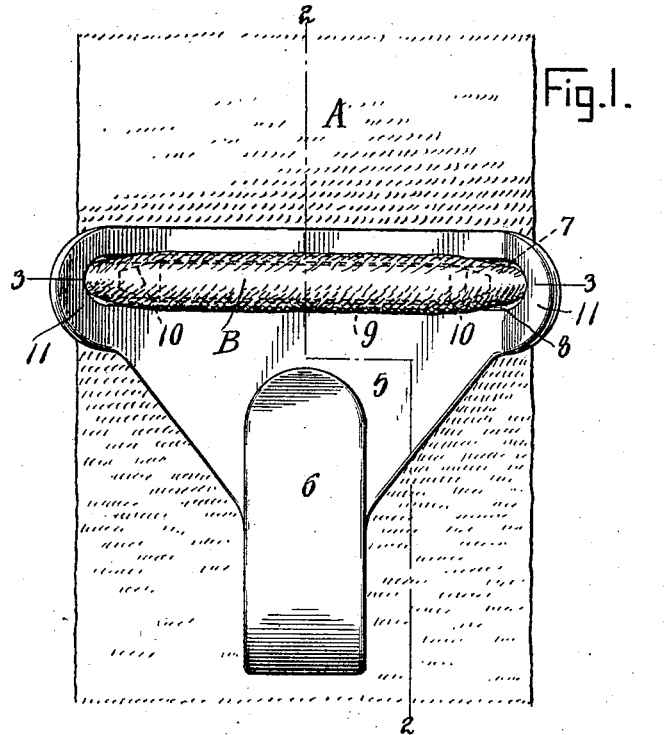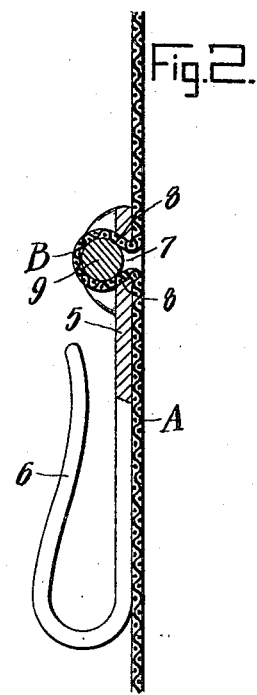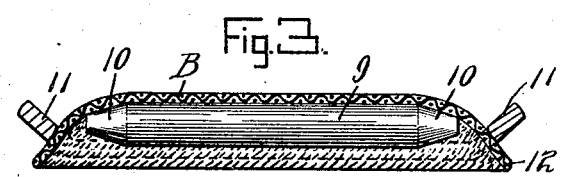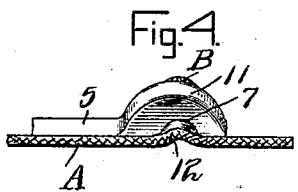

WILLIAM C. MARTIN, OF MEMPHIS, TENNESSEE.

BACKBAND-HOOK.

1,392,843. Specification of Letters Patent. Patented Oct. 4, 1921.

Application filed March 30, 1921. Serial No. 456,833.

*To all whom it may concern:*

Be it known that I, WILLIAM C. MARTIN, a citizen of the United States, residing at Memphis, Shelby county, and State of Tennessee, have invented and discovered certain new and useful Improvements in Backband-Hooks, of which the following is a specification.

My said invention relates to hooks for back-bands and means for securing the same, and consists in the combinations and arrangements of elements hereinafter described and particularly set forth in the accompanying claims.

The invention has for its purpose to provide a hook for back-bands, which will securely hold in position, and which will not itself come into contact with the skin of the animal, whereby to avoid injury or chafing thereof.

Another object of the invention is to produce a device of this character which is of simple construction and may be readily adjusted in a simple and easily performed manner.

The invention is disclosed by way of illustration in the accompanying drawings, wherein:—

Figure 1 is a top plan view of the device, Fig. 2 a longitudinal sectional view thereof taken on the line 2—2 of Fig. 1, Fig. 3 a transverse sectional view, taken on the line 3—3 of Fig. 1, and Fig. 4 an end elevational view, with the hook proper omitted.

Referring to the construction in further detail, and wherein like reference characters designate corresponding parts, A designates the back-band, strap, or belt, on which the device is adapted to be adjustably applied, and the device *per se* consists of a body portion 5, constructed of iron or other metal, of necessary proportions to withstand the use to which the same would be subjected; and a hook 6, of any approved type, is formed integral with said body portion. The hook 6 may be provided with any suitable device for preventing the displacement of the member connected thereto, and it will also be noted that said hook 6 may constitute a separate member and be attached to the body part 5 in any preferred manner.

A slot 7 is formed transversely of the body portion 5 (see Fig. 2), and the side edges of said body portion, at said slot, are beveled, as at 8, thereby forming a suitable recess to receive a fold or loop B of the back-band; and a pin 9 fits within the fold and secures the device, after the manner shown.

The securing pin 9 is of a length shorter than the length of the slot 7 and has its end portions 10 tapered or pointed (see Fig. 3), which enables the same to be readily inserted from either end and also serves for fitting against the side portions of the back-band, in a manner which will cause the least wear thereon.

The end portions 11 of the body part 5 are up-turned, as in Figs. 3 and 4, to avoid the contracting of any metal parts of the hook with the skin of the animal, and the slot 7 extends well within said up-turned portions (see Fig. 1) and thereby, with the tapered ends 10 of the securing pin 9, causes the side edges of the belt to be turned downwardly or slightly gathered, as at 12, thus providing a substantially unbroken surface to the contacting surface of the belt.

It is obvious that those skilled in the art may vary the details of construction and arrangement of parts without departing from the spirit of my invention, and I therefore do not wish to be limited to such features except as may be required by the claims.

Having thus fully described my said invention, what I claim as new and desire to secure by Letters Patent, is:—

1. A back-band hook comprising a body portion formed with a hook proper and having a slot adapted to receive a fold of the back-band, said body portion being up-turned adjacent the respective ends of the slot, and a pin having tapered ends fitting within the folded portion of the back-band to secure the hook, substantially as set forth.

2. A back-band hook comprising a body portion formed with a hook proper and having a slot adapted to receive a fold of the back-band, the side edges of the body portion at the slot being beveled, and a pin having tapered ends fitting within the folded portion of the back-band to secure the hook, substantially as set forth.

3. A back-band hook comprising a body portion formed with a hook proper and having a slot adapted to receive a fold of the back-band, the side edges of the body portion at the slot being beveled, and a pin having tapered ends and shorter than the slot fitting within the folded portion of the back-band to secure the hook, substantially as set forth.

4. A back-band hook comprising a body portion formed with a hook proper and having a slot adapted to receive a fold of the back-band, the end portions of the body adjacent said slot being upturned, and a pin of shorter length than the slot fitting within said folded portion to secure the hook, said upturned portions and pin co-acting to cause the folded portion of the back-band to be gathered at the ends thereof, and to cover the ends of the pin and thus prevent its accidental axial displacement, substantially as set forth.

5. A back-band hook comprising a body portion formed with a hook proper and having a slot adapted to receive a fold of the back-band, the end portions of the body adjacent said slot being upturned, and a pin of shorter length than the slot and having tapered ends fitting within said folded portion to secure the hook, said upturned portions and the tapered ends of the pin co-acting to cause the folded portion of the back-band to be gathered at the ends thereof, substantially at set forth.

In witness whereof, I have hereunto set my hand and seal at Memphis, Tennessee, this 25th day of March, A. D. nineteen hundred and twenty-one.

WILLIAM C. MARTIN [L. S.]

Witnesses:
   JOHN W. FARLEY,
   F. M. BAILEY.